Figure 1:
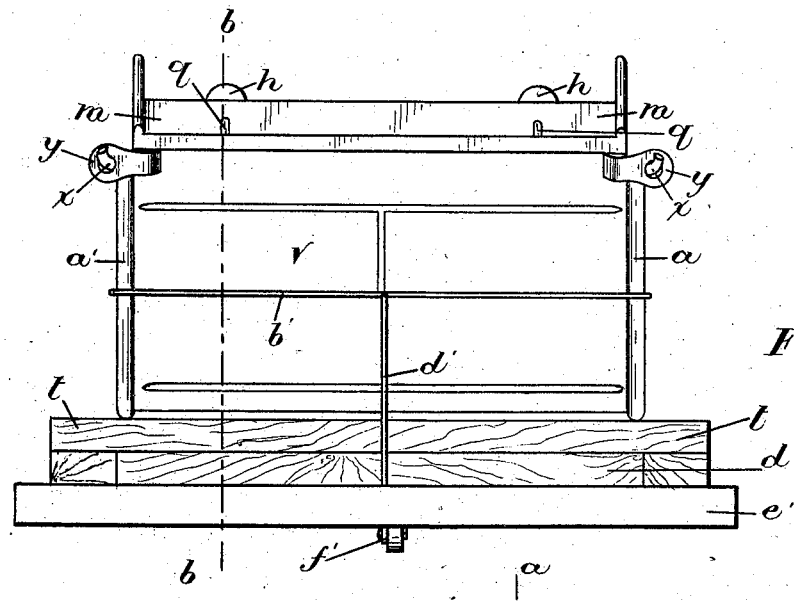

No. 785,262. PATENTED MAR. 21, 1905.
J. LUND.
MOLDING MACHINE.
APPLICATION FILED MAR. 30, 1904.

4 SHEETS—SHEET 1.

Witnesses
Inventor.

No. 785,262. PATENTED MAR. 21, 1905.
J. LUND.
MOLDING MACHINE.
APPLICATION FILED MAR. 30, 1904.
4 SHEETS—SHEET 2.
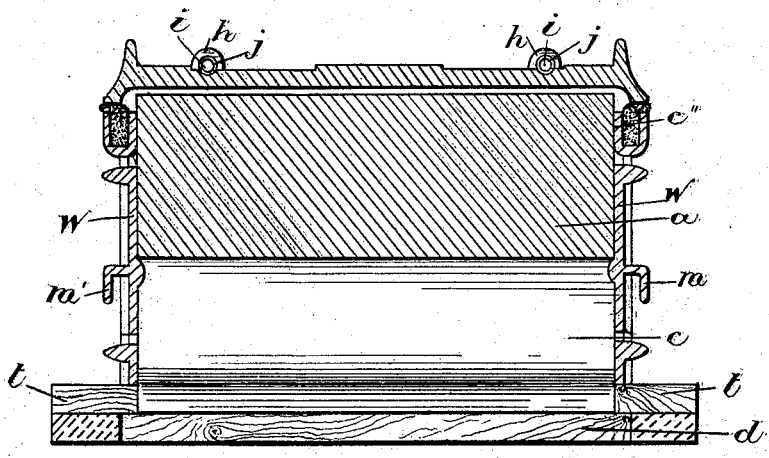
Fig. 3.
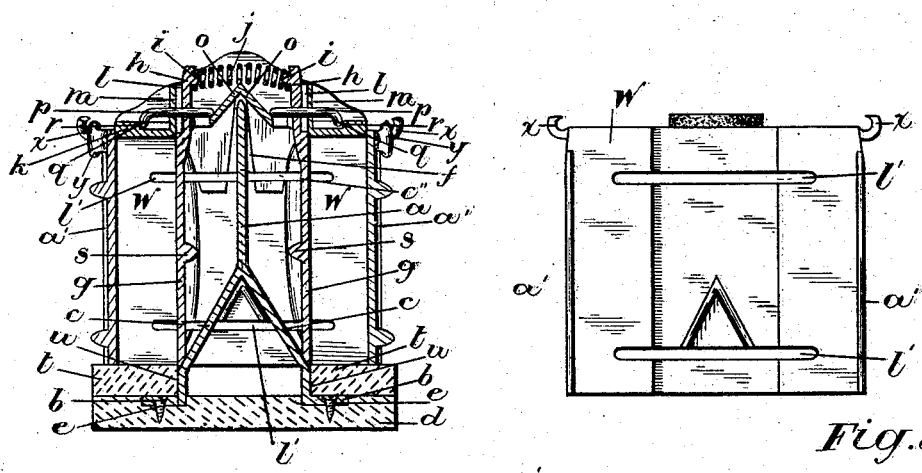
Fig. 4.
Fig. 5.
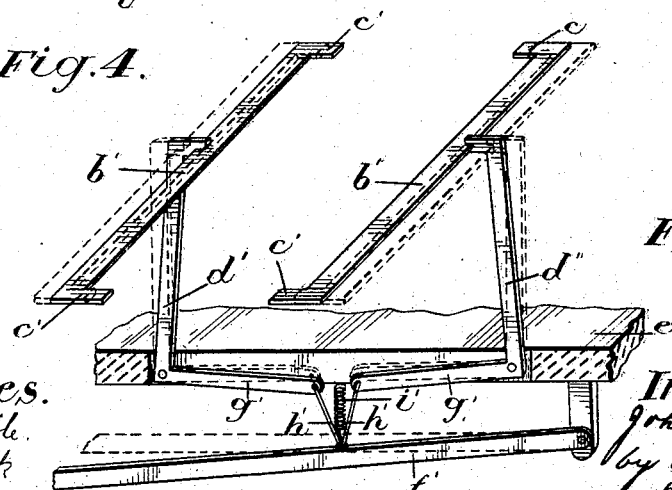
Fig. 8.
Witnesses.
H. L. Trimble.
L. F. Brock.
Inventor.
John Lund
by C. H. Rickes
his attorney No. 785,262. PATENTED MAR. 21, 1905.
J. LUND.
MOLDING MACHINE.
APPLICATION FILED MAR. 30, 1904.
4 SHEETS—SHEET 3.
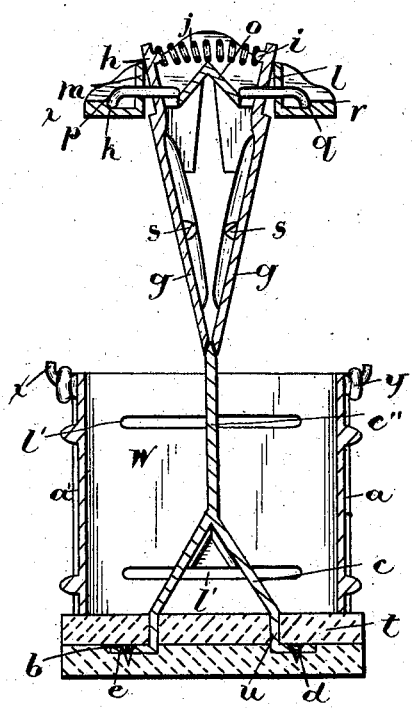
Fig.4.ª
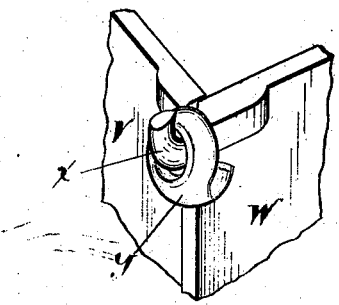
Fig.5.ª
Witnesses.
H. L. Trimble
L. F. Birch
Inventor:
John Lund
by C. H. Riches
his attorney No. 785,262. Patented March 21, 1905.

UNITED STATES PATENT OFFICE.

JOHN LUND, OF WOODSTOCK, CANADA, ASSIGNOR OF ONE-HALF TO FREDERICK W. DUNN, OF WOODSTOCK, CANADA, AND WILLIAM E. DUNN, OF CHICAGO, ILLINOIS.

MOLDING-MACHINE.

SPECIFICATION forming part of Letters Patent No. 785,262, dated March 21, 1905.

Application filed March 30, 1904. Serial No. 200,676.

*To all whom it may concern:*

Be it known that I, JOHN LUND, of the city of Woodstock, in the county of Oxford and Province of Ontario, Canada, have invented certain new and useful Improvements in Molding-Machines; and I hereby declare that the following is a full, clear, and exact description of the same.

In artificial-stone blocks made from a mixture of siliceous and cementing material, and more particularly in that class of artificial stone technically known as "bridge-block" and which may be described as consisting of two side walls bonded together by cross-walls integrally formed with the side walls and having a dead-air space in the middle for insulation purposes, it has been found that the cross-walls, owing to the condensative, absorbent, and conductive properties of the block convey the moisture from one surface of the artificial stone where it is opposed to such cross-walls to the other and that while those parts of the side-wall surfaces opposite the apertures may be perfectly dry the other parts of the side-wall surfaces opposite the cross-walls will sweat to a greater or lesser degree, dependent upon the surrounding atmospheric conditions.

I have found that by making the bridge-block with an aperture extending throughout its entire length and depth and bonding its sides together by bond-irons molded in the composition there will be no conduction from one surface to the other of moisture or heat, and to devise a machine which will mold a block of this character is the object of the present invention. In carrying this object into practice I employ a stationary core secured to a suitable base member which forms the support for the apertured follow-board or pallet for the flask or mold-box, which when positioned upon the follow-board or pallet completely incloses the stationary core. The flask or mold-box consists of two opposite side members and two end members hinged to the side members along their top edge in such a manner that they will open outward as the flask or mold-box is lifted from the follow-board or pallet to prevent it during its removal shattering the homogeneity of the molded mixture or defacing its conformation. The end members of the flask or mold-box have longitudinally-disposed flanges to overlap the outer surfaces of the side members when closed together and prevent the outward displacement of the side members by reason of the internal pressure of the contents during the molding of the block, the end members being held together by flask-clamps arranged to embrace the sides and ends of the flask when assembled. In the flask end members are transversely-disposed slots extending beyond the opposite sides of the core to permit of the introduction into the flask of the substantially U-shaped bond-irons which unite or bond together the opposite sides of the hollow block. In molding the apertured block the follow-board or pallet is placed upon the base member with the stationary core projecting through its aperture. The flask or mold-box is then placed upon the follow-board or pallet to inclose the stationary core, and the centering means, forming part of the flask end members, engage the stationary core and correctly position the flask or mold-box around it. A mixture of silicious and cementing material, preferably in the proportion of six parts silicious material to one part of cementing material, are intimately mixed together in a dry state until the particles of silicious material are coated with the finer particles of the cementing material. The mixture is then slightly moistened and placed in the flask or mold-box, and the removable core is forced into it under pressure. To effect a compression of the mixture within the flask or mold-box, the removable core is composed of two spring-tensioned core members articulatingly connected at one end to a hinge member, so that they will close together at the other end under the influence of the tension-spring and form a wedge to readily enter the mixture as the removable core is forced into it, the core members being expanded by the stationary core entering between them to compress the mixture into its molded form.

For a full understanding of the invention reference is to be had to the following description and to the accompanying drawings, in which—

Figure 2:
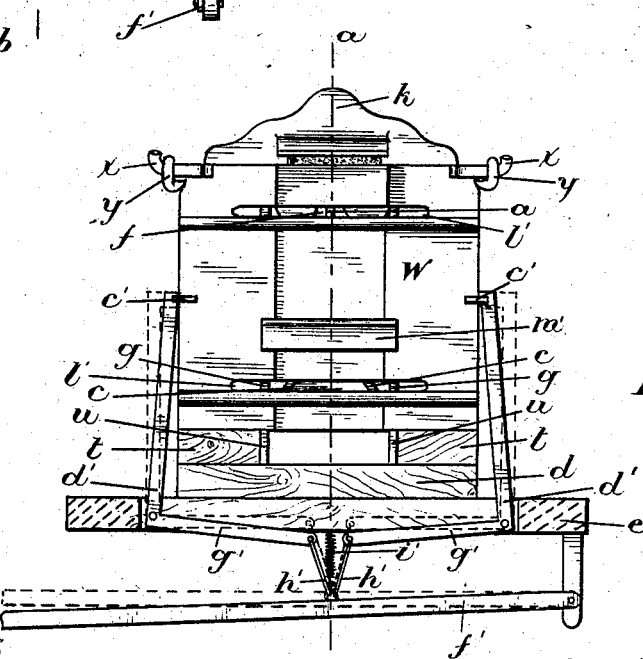
Figure 6:
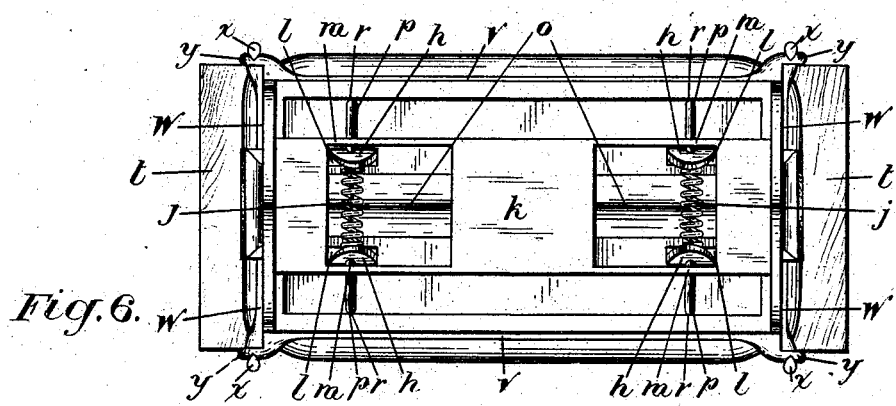
Figure 7:
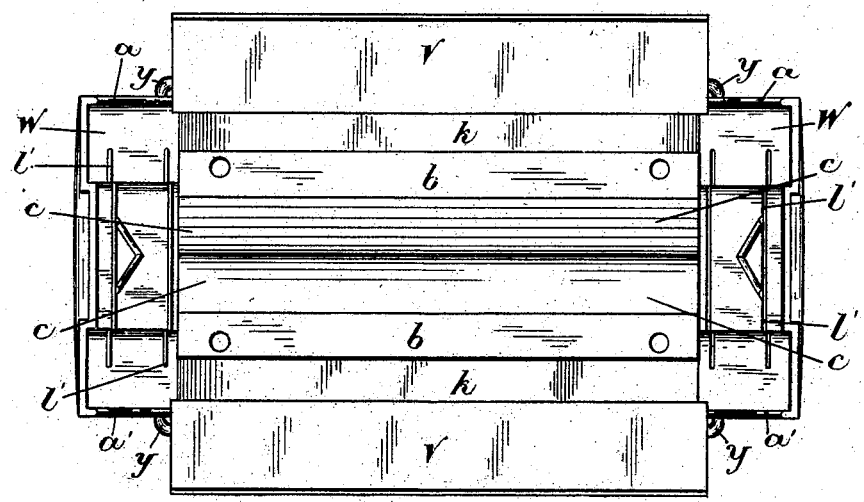
Figure 9:
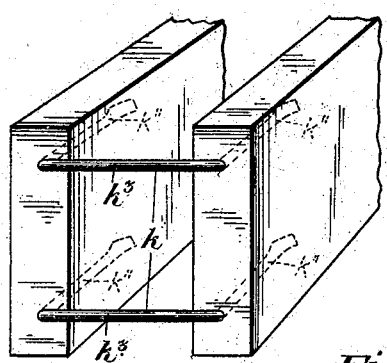
Figure 10:
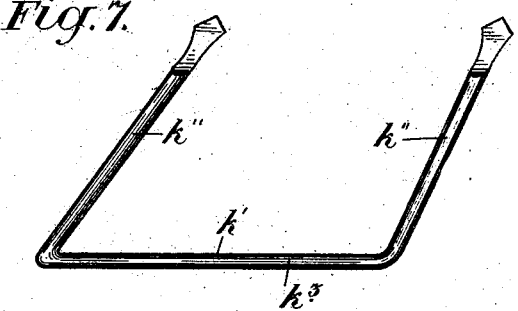

Figure 1 is a side elevation of the apparatus. Fig. 2 is an end elevation of the same. Fig. 3 is a longitudinal section on the lines $a\ a$ of Fig. 2. Fig. 4 is a sectional view on the lines $b\ b$, Fig. 1. Fig. 4$^a$ is a similar view to Fig. 4, showing the removable core being inserted in the flask; and Fig. 5$^a$ is a perspective view of the hinge connection between the flask side and end members. Fig. 5 is a view of one of the end members of the flask looking at it from the inner side. Fig. 6 is a plan view of the top of the flask with the side and end members in their closed position. Fig. 7 is a plan view of the flask looking at it from the bottom with the side and end members opened outward. Fig. 8 is a perspective view of the clamping mechanism for holding the side and end members in their closed position. Fig. 9 is a sectional view of the molded block. Fig. 10 is a view of one of the bond-irons.

Like letters of reference refer to like parts throughout the specification and drawings.

The stationary core $a$, which is of a substantially inverted-Y shape, with outturned flanges $b$ at the free ends of its bifurcated arms $c$, is secured to the base member $d$ by screw-nails $e$ passing through the flanges and entering the material of the base member. The upper end of the opposite sides of the stem $c''$ of the stationary core converge to form a miniature wedge $f$ to readily enter the opening between the core members $g$ as they come into contact with it. The core members $g$ have at their upper ends apertured lugs $h$, with inturned beads $i$ on their inner faces, to which are fastened the ends of the coiled tension-springs $j$ employed to close the opposite ends of the core members $g$ together when the removable core is being withdrawn from the mold-box. Forming part of the removable core is a top member or lid $k$, having longitudinal slots $l$ positioned to receive the apertured lugs $h$, and along the outer edges of the slots $l$ are vertical flanges $m$, and along the inner edges of the slots $l$ are inclined flanges $o$. Passing through the vertical flanges $m$ and apertured lugs $h$ are hinge-pins $p$, the inner ends of which rest upon the inclined flanges $o$, the outer ends of which have downturned arms $q$ to rest upon the upper surface of the top member or lid $k$ and engage the retaining-shoulders $r$ to prevent the displacement of the hinge-pins from their operative position. Along the inner surfaces of the core members $g$ are strengthening-ribs $s$, and at the outer ends of the core members are beveled engaging faces to enable the core members to come evenly together in their closed position and form a penetrating-wedge to enter the mixture in the mold-box.

Upon the base member $d$ is placed the follow-board or pallet $t$, which during the molding of the block constitutes the bottom of the mold-box, and in the follow-board or pallet $t$ is an aperture $u$, corresponding in shape and size with the bifurcated arms of the stationary core. When the follow-board or pallet is placed upon the base member, it will engage the bifurcated arms and prevent the granular material banking around the bottom of the arms or upon the base member. The mold-box or flask consists of two side members $v$ and two end members $w$. At the top of the end members $w$ are laterally-extending hook-shaped lugs $x$, and at the top of the side members $v$ are longitudinally-disposed apertured lugs $y$, through which project the hook-shaped lugs $x$ to articulatingly connect the side and end members together. The apertured lugs $y$ where they contact the lugs $x$ have beveled surfaces $z$, forming recesses or seats into which enter the lugs $x$ to allow of the side members $v$ closing evenly against the end members $w$ throughout their entire depth. The end members $w$ have flanges $a'$ to overlap and engage the adjacent ends of the side members $v$ and prevent the outward displacement of the side members. To hold the side and end members in their closed position, I employ a clamping mechanism consisting of two flask-clamps $b'$, placed on opposite sides of the flask or mold-box and having hooked ends $c'$ to overlap and engage the end members $w$. The flask-clamps $b'$ are connected to bell-crank levers $d'$, and these bell-crank levers are articulatingly connected to the table $e'$ of the press on which the molding apparatus is placed, and fulcrumed to the table $e'$ is a spring-tensioned lever $f'$, connected by links $h'$ to the arms $g'$ of the bell-crank lever, the tendency of the spring $i'$ being to raise the lever and disengage the flask-clamps $b'$ from the end members of the mold-box or flask when the actuating-lever is released.

In the use of the apparatus the follow-board or pallet $t$ is placed in position upon the base member $d$ with the stationary core projecting through its aperture. The mold-box or flask is then placed around the stationary core and positioned by the centering means $j''$, which form an integral part of the inner surfaces of the end members, entering the space between the bifurcated arms of the stationary core, the side members and end members of the flask or mold-box being closed together with the flanges of the end members partly overlapping the outer surfaces of the side members to prevent the outward displacement of the side members when the mold-box or flask is subjected to the pressure of its contents. The lever $f'$ is then actuated to bring the flask-clamps $b'$ against the outer surfaces of the side members and the hooked ends $c'$ into engagement with the outer surfaces of the end members, pressure being maintained upon the clamping-lever to maintain the flask-clamps in position against the side and end members until the block has been molded. The mixture of silicious and cementing material is then placed in the mold-box or flask, and the bond-irons $k'$, which are substantially U-shaped, are inserted into the mixture through the transverse openings $l'$ in the end members $w$, with the arms $k''$ alining with the ends of the transverse openings $l'$ and the cross-pieces $k^3$ abutting against the adjacent ends of the stationary core. The removable core is then inserted into the mold-box or flask with the wedge of the stationary core inserted in the opening between the core members. The removable core is then forced into the mixture, and as it enters the mixture the core members $g$ pass down and closely contact the opposite sides of the stationary core $a$ until they arrive at the junction of the bifurcated arms $c$ with the stem $c''$, which gradually expand them as they continue their further descent until they come into contact with the top of the follow-board or pallet, which arrests their further descent, the core members then being expanded into their opened position, which is substantially perpendicular to the follow-board or pallet. The top member of the removable core, which has then slightly entered the top of the mold-box or flask, compresses and molds the top of the mixture as the expansion members of the core compresses it laterally. The expansion of the core members produces in the molded block an aperture which extends from the top to the bottom and from end to end of the same.

When the block is molded, the removable core is withdrawn vertically from the mold-box or flask, and as it rises the core members $g$ close inward under the influence of the tension-springs and engage on the opposite sides of the stationary core until they attain the top of the same, when their free edges come together. The closing movement of the core members $g$ permits the removable core to be withdrawn from the molded block without contacting the same and by doing so avoids any possibility of its homogeneity being shattered or its conformation defaced by the withdrawal of the removable core. The clamping-lever $f'$ is then actuated to release the flask-clamps $b'$ from engagement with the end and side members, and the molding apparatus is then removed from the table, and the end members are opened outward by means of the hand-grips $m'$. Coincident with the opening of the end members $w$ the hook-shaped lugs $x'$ rotate in the apertured lugs $y$ and actuate the side members $v$ to open outward as they rock in the same, the opening movement of the side and end members being sufficient only to relieve the molded block of any contact therewith, so that the mold-box or flask can be removed from the molded block without destroying the homogeneity or defacing the conformation of its molded contents. The follow-board or pallet, with the molded block, is then raised from the base member and lifted clear of the stationary core, from which it is carried to the place where it is to set and harden.

Having thus fully described my invention, what I claim as new, and desire to secure by Letters Patent, is—

1. In a molding-machine the combination of a stationary core, a flask inclosing the stationary core consisting of side members and end members articulatingly connected to the side members, a lid for the flask and a removable core member consisting of two side members articulatingly connected to the lid.

2. In a molding-machine the combination of a stationary core, a flask inclosing the stationary core consisting of side members and end members articulatingly connected to the side members, a lid for the flask, a removable core member consisting of two side members articulatingly connected to the lid, and springs connected to the side members of the removable core to cause their contraction.

3. In a molding-machine the combination of a base member, a core member therefor, and a flask consisting of side members, and end members having transversely-disposed slots therein opposed to and extending beyond each side of the core member.

4. In a molding-machine the combination of a base element, a substantially Y-shaped core member therefor, and a flask consisting of side and end members articulatingly connected together, and centering means therefor connected to the end members to engage the core member and correctly position the flask.

5. In a molding-machine the combination of a flask consisting of side members having longitudinally-disposed apertured lugs and end members having laterally-disposed hook-lugs to extend through the apertured lugs and articulatingly connect the side and end members together, a stationary core contained within the flask and a removable core consisting of two articulating members to be expanded by the stationary core as the removable core enters the flask.

6. In a molding-machine the combination of a flask consisting of side members having longitudinally-disposed apertured lugs and end members having laterally-disposed hook-lugs to extend through the apertured lugs and articulatingly connect the side and end members together, a stationary core contained within the flask, a removable core consisting of two articulating members to be expanded by the stationary core as the removable core enters the flask, and transversely-disposed slots in the end members extending beyond the core members to permit of the bond-irons being inserted into the flask.

7. In a molding-machine the combination of a flask consisting of side members having longitudinally-disposed apertured lugs and end members having laterally-disposed hook-lugs to extend through the apertured lugs and articulatingly connect the side and end members together, a stationary core contained within the flask and a removable core consisting of two articulating members to be expanded by the stationary core as the removable core enters the flask, and tension-springs for the articulating core members.

8. In a molding-machine the combination of a flask consisting of side members having longitudinally-disposed apertured lugs and end members having laterally-disposed hook-lugs to extend through the apertured lugs and articulatingly connect the side and end members together, a stationary core contained within the flask, a removable core consisting of two articulating members to be expanded by the stationary core as the removable core enters the flask, transversely-disposed slots in the end members extending beyond the core members to permit of the bond-irons being inserted into the flask, and tension-springs for the articulating core members.

9. In a molding-machine the combination of a flask, a stationary core therefor, a removable lid for the flask and a removable core consisting of two articulating core-sections connected thereto to be expanded into position by the stationary core as the removable core enters the flask.

10. In a molding-machine the combination of a flask, a stationary core therefor, a removable lid for the flask and a removable core consisting of two articulating core-sections connected thereto to be expanded into position by the stationary core as the removable core enters the flask, and tension-springs to contract the articulating core-sections as the removable core is withdrawn from the flask.

11. In a molding-machine the combination of a flask, a lid therefor, transversely-disposed hinge-pins supported by the lid and core-sections articulatingly mounted on the pins.

12. In a molding-machine the combination of a flask, a lid therefor, transversely-disposed hinge-pins supported by the lid and core-sections articulatingly mounted on the pins, and tension-springs to contract the core-sections as they are withdrawn from the flask.

13. In a molding-machine the combination of a flask, a lid therefor, having alining slots at each side, and vertically-disposed lugs at the outer sides of the slots, core-sections having lugs projecting through the alining slots and hinge-pins projecting through the lugs of the core-sections and removable lid.

14. In a molding-machine the combination of a flask, a lid therefor, having alining slots at each side, and vertically-disposed lugs at the outer sides of the slots, core-sections having lugs projecting through the alining slots and hinge-pins projecting through the lugs of the core-sections and removable lid and tension-springs to contract the core-sections as they are withdrawn from the flask.

15. In a molding-machine the combination of two bell-crank levers positioned to engage the opposite sides of the flask, an operating-lever, links connecting the operating-lever with the bell-crank levers, and flask-clamps carried by the bell-crank levers to engage the ends and sides of the flask.

16. In a molding-machine the combination of two bell-crank levers positioned to engage the opposite sides of the flask, an operating-lever, links connecting the operating-lever with the bell-crank levers, and flask-clamps carried by the bell-crank levers to engage the ends and sides of the flask, and a tension-spring to return the actuating-lever to its inoperative position.

17. In a molding-machine, a flask consisting of side members having longitudinally-disposed apertured lugs, end members having laterally-disposed hook-lugs to extend through the apertured lugs and articulatingly connect the side and end members together so as to cause their united assembly and separation, in combination with two bell-crank levers positioned to engage the opposite sides of the flask, an operating-lever, links connecting the operating-lever with the bell-crank levers, and flask-clamps carried by the bell-crank levers to engage the ends and sides of the flask.

18. In a molding-machine, a flask consisting of side members having longitudinally-disposed apertured lugs, end members having transversely-disposed slots therein to permit of the bond-irons being inserted into the material to be molded, and laterally-disposed hooked lugs for the end members to extend through the apertured lugs and articulatingly connect the side and end members together so as to cause their united assembly and separation, in combination with two bell-crank levers positioned to engage the opposite sides of the flask, an operating-lever, links connecting the operating-lever with the bell-crank levers, and flask-clamps carried by the bell-crank levers to engage the ends and sides of the flask.

19. In a molding-machine the combination of a base element and a flask consisting of side members having longitudinally-disposed apertured lugs, end members having laterally-disposed hook-lugs to extend through the apertured lugs and articulatingly connect the side and end members together so as to cause their united assembly and separation, in combination with two bell-crank levers positioned to engage the opposite side of the flask, an operating-lever, links connecting the operating-lever with the bell-crank levers, and flask-clamps carried by the bell-crank levers to engage the ends and sides of the flask.

20. In a molding-machine the combination of a base element, a core element therefor, a flask consisting of side members having longitudinally-disposed apertured lugs, end members having laterally-disposed hook-lugs to extend through the apertured lugs and articulatingly connect the side and end members together so as to cause their united assembly and separation, two bell-crank levers positioned to engage the opposite sides of the flask, an operating-lever, links connecting the operating-lever with the bell-crank levers, and flask-clamps carried by the bell-crank levers to engage the ends and sides of the flask.

21. In a molding-machine the combination of a base element, a flask consisting of side members having longitudinally-disposed apertured lugs, end members having transversely-disposed slots therein to permit of the bond-irons being inserted into the material to be molded, laterally-disposed lugs for the end members to extend through the apertured lugs and articulatingly connect the side and end members together so as to cause their united assembly and separation, two bell-crank levers positioned to engage the opposite sides of the flask, an operating-lever, links connecting the operating-lever with the bell-crank levers, and flask-clamps carried by the bell-crank levers to engage the ends and sides of the flask.

22. In a molding-machine the combination of a base element, a core element therefor, a flask consisting of side members having longitudinally-disposed apertured lugs, end members having transversely-disposed slots therein to permit of the bond-irons being inserted into the material to be molded, laterally-disposed hooked lugs for the end members to extend through the apertured lugs and articulatingly connect the side and end members together so as to cause their united assembly and separation, two bell-crank levers positioned to engage the opposite sides of the flask, an operating-lever, links connecting the operating-lever with the bell-crank levers, and flask-clamps carried by the bell-crank levers to engage the ends and sides of the flask.

Woodstock, March 10, 1904.

JOHN LUND.

In presence of—
G. S. MURPHY,
A. M. KINNEEN.